W. B. ALLEN.
Device for Preventing Boards from Warping.
No. 209,371.   Patented Oct. 29, 1878.
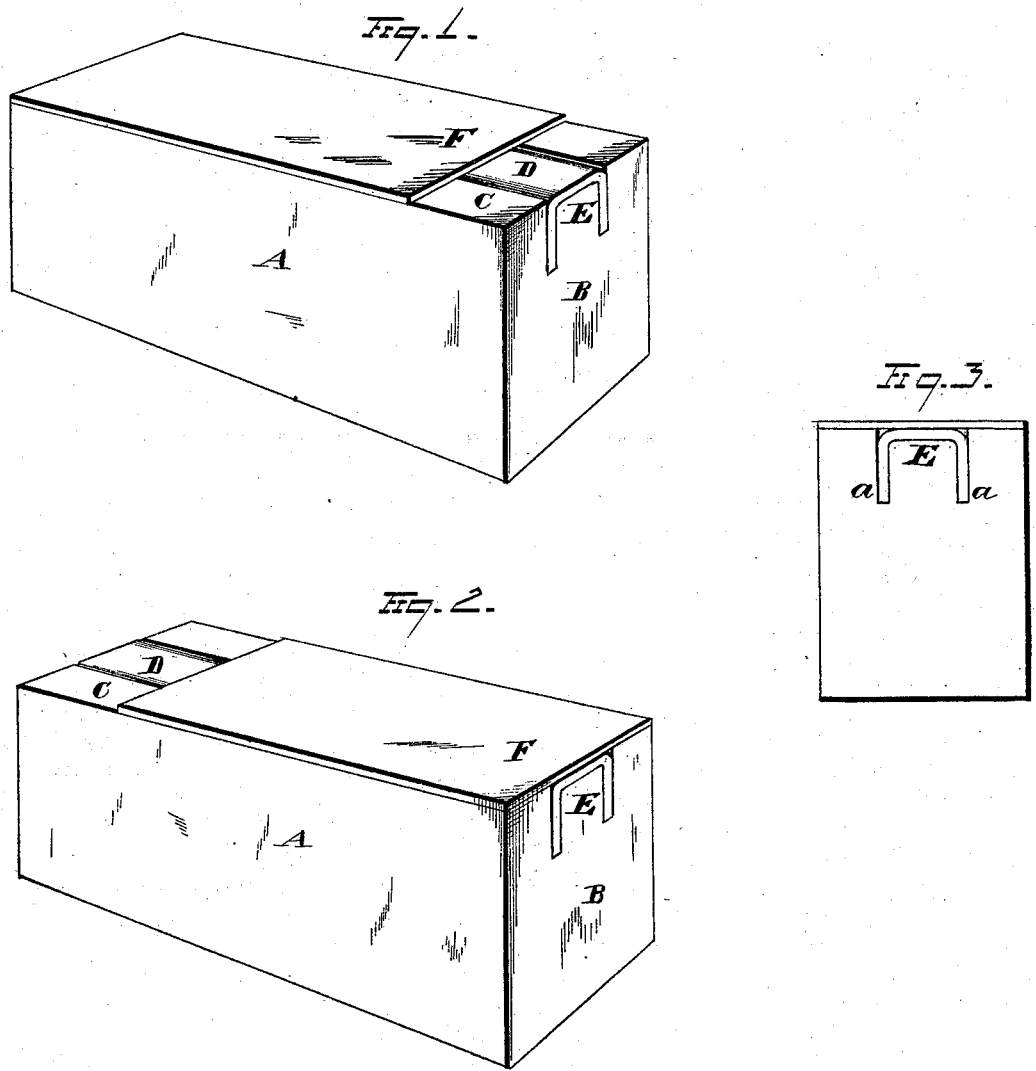

UNITED STATES PATENT OFFICE.

WILLIAM B. ALLEN, OF ORLEANS, NEW YORK.

IMPROVEMENT IN DEVICES FOR PREVENTING BOARDS FROM WARPING.

Specification forming part of Letters Patent No. 209,371, dated October 29, 1878; application filed August 11, 1877.

*To all whom it may concern:*

Be it known that I, WILLIAM B. ALLEN, of Orleans, in the county of Ontario and State of New York, have invented a new and useful improvement in preventing boards and planks and things made from them from warping and stiffening them transversely to the grain of the wood, which improvement is fully set forth in the following specification and drawings, in which—

Figures 1 and 2 are perspective views of a piece of board with my contrivance applied. Fig. 3 is an end view of the same.

The object of my invention is to furnish a device by which to prevent boards and planks and things made from the same from warping, and to stiffen them transversely to the grain of the wood.

In the drawings, A, Figs. 1 and 2, is a side or surface of a piece of board, the grain or fiber being in the direction of the shortest dimension of the side. B, Figs. 1 and 2, is an edge of the piece. C, Figs. 1 and 2, is an end of the piece, which is cut transversely to the grain of the wood. D is a thin strip of metal or other material, rigid in the direction of its width, having its sides bent toward each other to a right angle with the section intermediate, so that a cross-section of it, when shaped, is in the form of three sides of a square or rectangle, or nearly so, and is laid, the intermediate section of it, flatwise in a groove or slot in the end of the piece, and the averted sections are set edgwise in slits sawed into the end of the board, as shown in Figs. 1, 2, and 3. E, Figs. 1, 2, and 3, is an end view of the strip, which is inserted in the board in the direction of the width of the latter. The strip may be of common sheet-iron or of steel, or other rigid and flexible material, may be fastened in any convenient way, and may be covered or not.

F, Figs 1 and 2, is a piece of veneering put over the strip to conceal and hold the same in place, a portion of the veneering being left off at one end for the purpose of showing the upper surface of a part of the intermediate section of the strip and the manner of its insertion more fully.

From the foregoing it will be seen that the intermediate section of the strip, which is laid flatwise in the groove in the end of the board, being rigid in the direction of its width, and its rigidity being strengthened by the angular bends at its edges, before this section can bend edgewise one or the other of the averted sections $a$, Fig. 3, must stretch; that the strip, when in place, will, to a great extent, prevent the board from warping; and that it can warp only to an extent equal to the deflection of the intermediate section edgewise; and, further, that at the end the board will be greatly stiffened transversely to the grain of the wood.

What I claim as my invention, and desire to secure by Letters Patent, is—

The combination, with a board or plank whose end is provided with a longitudinal groove and two right-angular slits respectively formed on both sides of said groove, of a strip of metal or other rigid substance whose form in cross-section is that of three sides of a square, substantially as and for the purpose described.

WILLIAM B. ALLEN.

Witnesses:
STEPHEN CULVER,
WM. G. BURNHAM.